United States Patent [19]

Maxedon et al.

[11] Patent Number: 5,143,452
[45] Date of Patent: Sep. 1, 1992

[54] SYSTEM FOR INTERFACING A SINGLE SENSOR UNIT WITH MULTIPLE DATA PROCESSING MODULES

[75] Inventors: Lynn F. Maxedon; Thomas C. Olson, both of Cedar Rapids, Iowa

[73] Assignee: Rockwell International Corporation, Seal Beach, Calif.

[21] Appl. No.: 650,142

[22] Filed: Feb. 4, 1991

[51] Int. Cl.[5] .......................... G01K 7/00; G01K 3/00
[52] U.S. Cl. ...................................... 374/170; 73/295; 307/310; 364/557
[58] Field of Search ................................. 73/295, 301; 364/571.03; 374/170; 307/310

[56] References Cited

U.S. PATENT DOCUMENTS

| | | | |
|---|---|---|---|
| 4,621,228 | 11/1986 | Toki et al. | 364/571.03 X |
| 4,825,383 | 4/1989 | Ory | 73/295 X |
| 4,875,176 | 10/1989 | Harsch et al. | 374/170 X |
| 4,943,797 | 7/1990 | Steffenhagen | 73/295 X |
| 5,001,928 | 3/1991 | Ogasawara | 340/620 X |
| 5,051,615 | 9/1991 | Rosenthal | 374/170 X |

Primary Examiner—Daniel M. Yasich
Attorney, Agent, or Firm—John J. Horn; M. Lee Murrah; H. Fredrick Hamann

[57] ABSTRACT

A fault-tolerant system for interfacing a single sensor unit to multiple display/control modules. The system includes a fixed resistor connected in series with the sensor unit and multiple data centralization units each including a source for providing a separate excitation signal to the sensor unit. The data centralization units also include detection circuits for measuring the voltage drop across the fixed resistor. The output from the sensor unit is adjusted according to the level of excitation provided to the sensor unit so that accurate measurements can be taken despite one or more data centralization units being non-operational.

10 Claims, 1 Drawing Sheet

SYSTEM FOR INTERFACING A SINGLE SENSOR UNIT WITH MULTIPLE DATA PROCESSING MODULES

BACKGROUND OF THE INVENTION

The present invention relates to and more particularly to devices and methods for interfacing a single sensor unit requiring an excitation signal with multiple data processing units.

In many instrumentation systems it is required to simultaneously provide data from a single sensor unit to multiple data processing functions. Further, it is often necessary to externally furnish an excitation signal to the sensor unit and for certain applications such as for avionics systems, it is required that instrumentation systems function with high reliability. The problem of furnishing a proper excitation signal is complicated by the reliability requirements for the system since any fault in providing the excitation signal to the sensor may subsequently result in multiple data processing functions being affected. The obvious solution would appear to be to provide multiple sensor units but this is frequently not possible due to space and cost limitations.

Therefore, it is an object of the present invention to provide a fault-tolerant system for interfacing a single sensor unit requiring an external excitation signal with multiple data centralization units which feed information to multiple data processing functions.

It is another object of the present invention to provide a fault-tolerant system for interfacing a single sensor unit to multiple data centralization units which is not dependent on a single excitation signal from a single source and which allows the other data centralization units and the sensor unit to continue functioning despite the breakdown of one or more of the data centralization units.

It is a further object of the present invention to provide a fault-tolerant system for interfacing a single sensor unit with multiple data centralization units that is fault-tolerant yet is simple to implement and is economic to construct.

SUMMARY OF THE INVENTION

The present invention constitutes fault-tolerant system for interfacing a single sensor unit requiring an excitation signal with multiple data centralizing units. The system includes a sensor unit such as a resistive temperature device, a fixed resistor and a number of data centralization units which are interconnected to the resistor and sensor unit. The data centralization units each include a current source for providing separate excitation signals to the sensor unit through the fixed resistor and include a pair of detection circuits adapted for measuring the voltage drops across the fixed resistor and the sensor unit. The detection circuits are in turn coupled to a signal processing system which processes the output signals they provide in order to generate a signal indicative of environmental conditions at the sensor unit.

In operation, the excitation signals from all of the data centralization units are combined at the fixed resistor and the voltage drop across this resistor provides an indication of the total current being provided to the resistive device and the number of operative centralization units. The signal from the sensor unit may then be adjusted in accordance with the level of current through the fixed resistor to reflect the number of data centralization units which are operational and provide on output signal accurately representing process conditions at the sensor unit.

DESCRIPTION OF THE PREFERRED EMBODIMENT

Figure 1:
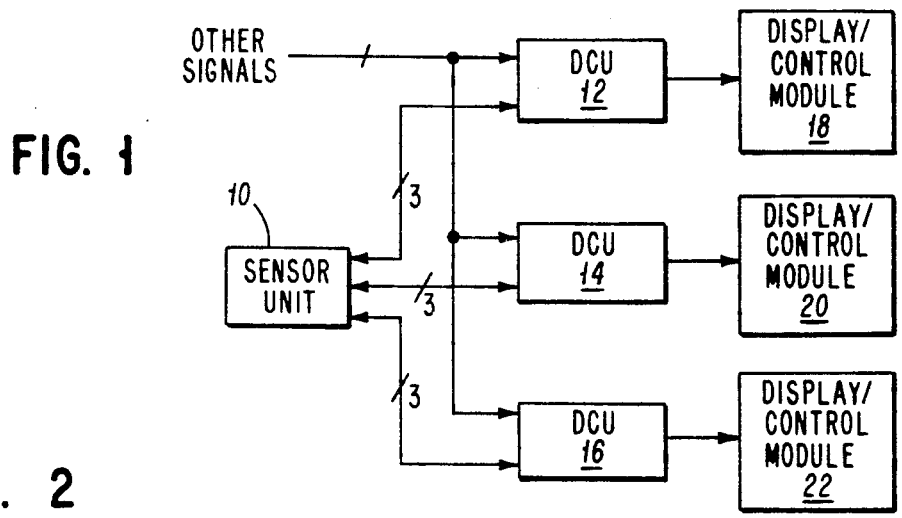
FIG. 1 depicts a block diagram of the interface system in accordance with the principle of the present invention.

Referring now to FIG. 1, the system 8 provides for the interfacing of a sensor unit 10 with a multiple number of display/control units 18, 20 and 22 through the data centralizing units 12, 14 and 16. The data centralizing units, (DCU) 12, 14 and 16 are each connected by three lines to the sensor units 10. The data centralizing units 12, 14 and 16 are also connected for receiving other signals from other sensors or from other components which may be in analog or discreet formats or may comprise serial I/O. The data centralizing units 12, 14 and 16 are connected by bus lines to display/control modules 18, 20 and 22 which process and utilize the data provided by the data centralizing units.

Figure 2:
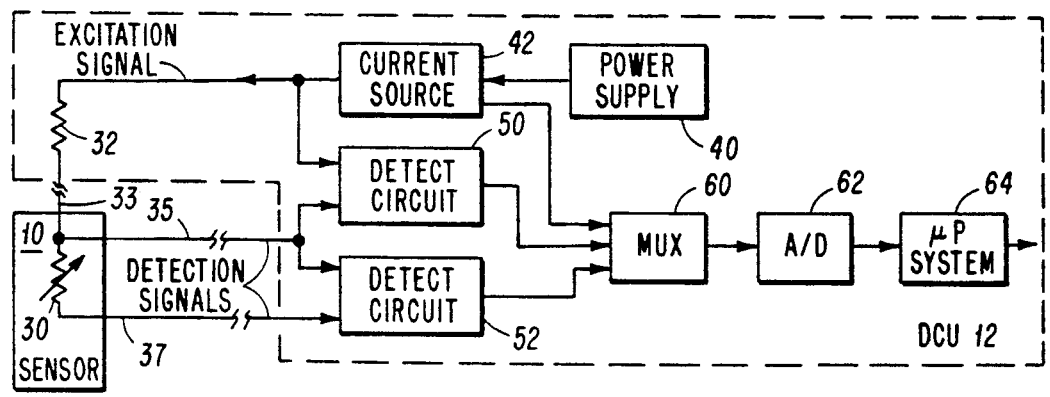
FIG. 2 depicts a block diagram of a single data centralization unit in accordance with the principles of the present invention as connected to a sensor unit.

Referring now to FIG. 2, a single data centralizing unit 12 is shown in conjunction with a sensor unit 10. The sensor unit 10 comprises a resistive temperature device which is characterized by resistance which is variable in response to a parameter, as for example, temperature changes and which requires an excitation signal to be externally provided for measurements to be taken. The sensor 10 is generally positioned at a location remote from the data centralizing unit 12 at which it can detect temperature values desired to be monitored. For example, if the system 8 and the data centralizing unit 12 were part of an avionics system in an aircraft, the sensor unit 10 might be positioned to detect fuel feed temperatures.

The sensor unit 10 is connected to the data centralizing unit 12 by the line 33 which carries an excitation signal to the unit 10 and by the lines 35 and 37 which carry detection signals to the unit 12. The excitation signal furnished over line 33 to the sensor unit 10 is generated in the data centralizing unit 12 by the current source 42 in response to a voltage source signal provided by the power supply 40. The current source 42 may be simply comprise a resistive network having an impedance which is substantial in comparison to the impedances of the resistive temperature device 30 and the fixed resistor 32.

The detect circuit 50 measures the voltage drop across the fixed resistor at 32 and provides a signal which is indicative of the level of this voltage drop. The detect circuit 52 measures the voltage drop across the sensor unit 10 (the resistive temperature device 30) and provides a signal indicative of the level of this voltage drop. The output signals from the detect circuits 50 and 52 are supplied to an analog multiplexer 60 which selects one or the other of these signals for supply on an alternating basis to the analog-to-digital converter 62. The analog-to-digital converter 62 digitizes the signal received from the multiplexer 60 by converting it from analog to digital format. Finally, the output of the analog-to-digital converter 62 is supplied to a microprocessor system 64 for processing under software control and "centralization" prior to being provided to the modules 18, 20 and 22 representing other instruments and systems which require the data for their own processing purposes.

Figure 3:
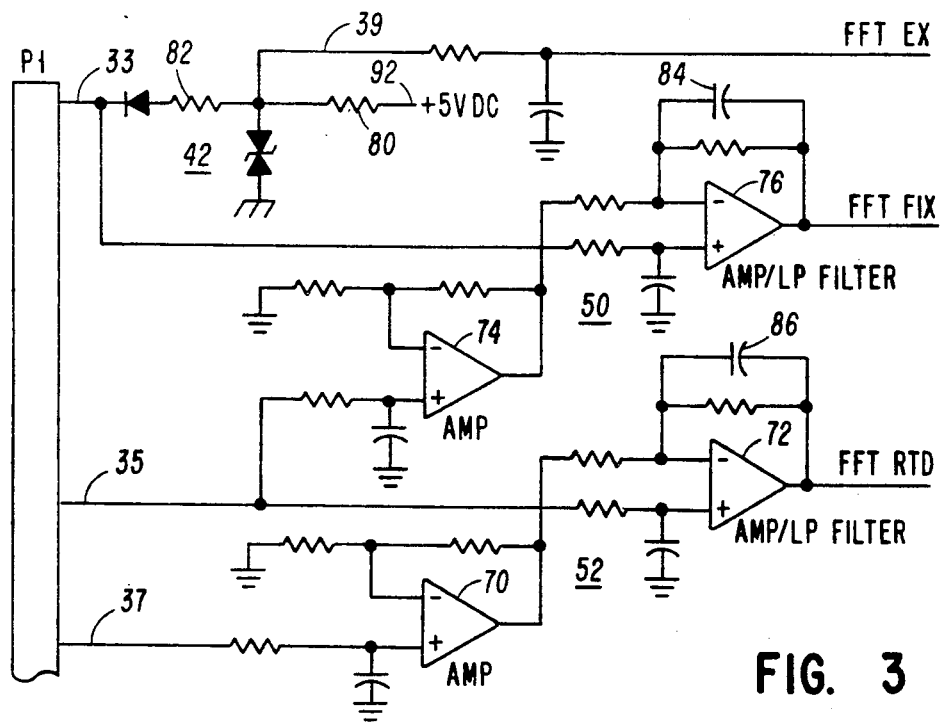
FIG. 3 provides a schematic diagram of a typical set of detection circuits for a data centralization unit in accordance with the principles of the present invention.

Referring now to FIG. 3, the circuitry required for the detect circuits 50 and 52 is shown in greater detail as including the operational amplifiers 70 and 72 which comprise the active components of the detection circuit 52 and the operational amplifiers 74 and 76 which comprise the active components of the detection circuit 50. The amplifiers 70 and 72 are constructed and arranged for amplifying the difference between teh voltages present on lines 37 and 35 with the amplifier 72 configured (by feedback capacitor 86) as a low-pass filter for suppressing noise. The amplifiers 74 and 76 are constructed and arranged for amplifying the difference between the voltages present on lines 35 and 33 with the amplifier 76 configured (by feedback capacitor 84) as a low-pass filter for suppressing noise. Lines 33, 35 and 37 are shown coupled to plug 1, remote sensor 10 (not shown) is remotely located from said plug 1. It shoudl be noted that the amplifiers 70, 72, 74 and 76 provide limited gain and instead act primarily as buffers presenting a high input impedance to signals representing the voltage drops across the fixed resistor and resistive temperature device. It should further be noted that many of the resistors, capacitors and diodes shown are intended to provide isolation and corresponding protection against voltage spikes and noise between the sensor unit 10 and the other components.

The resistor 80 operates on the +5 VDC supply voltage provided at point 92 to furnish a comparatively constant current on line 33 as the resistor 80 is selected to have a value substantially greater than either the resistor 32 or resistive temperature device 30.

The constant current signal is also passed back along line 39 to the multiplexer 60 from where it is supplied to the microprocessor 64 by way of the analog-to-digital convertor 62. The value of this constant current signal is then compared under software control with the value of the signal corresponding to the voltage dorp across the fixed resistor 32. This comparison provides an indication of whether the other data centralizing units 14 and 16 are operational which can be used in generating an appropriate signal that can be fed to a control console for operator review.

The lines FFt EX, FFT FIX and FFT RTD are shown as lines extending from current source 42, detect circuit 50, and detect circuit 52, respectively.

We claim:

1. A fault-tolerant system for interfacing a single sensor unit requiring an excitation signal with multiple data centralizing units, comprising:
   (a) a fixed resistor;
   (b) a sensor in a sensor unit which is connected in series with said fixed resistor for determining a parameter; and
   (c) a plurality of data centralizing units each of which includes:
   (1) a voltage source connected across said fixed resistor and said sensor unit,
   (2) a first voltage detection circuit adapted for detecting the voltage drop across said fixed resistor and generating a signal output indicative of said drop,
   (3) a second voltage detection circuit adapted for detecting the voltage drop across said sensor units and generating a signal output indicative of said drop, and
   (4) processor means for responding to said signal outputs to produce a signal indicative of conditions affecting said sensor unit.

2. The system of claim 1, in which said sensor comprises a resistive temperature device.

3. The system of claim 1, in which said data centralizing units each include operational amplifiers configured as low-pass filters.

4. The system of claim 1 in which said processor means each include:
   means for digitizing the outputs of said voltage detection circuits, and
   microprocessor means for processing the digitized outputs of said voltage detection circuits under software control.

5. A fault-tolerant method of interfacing a single sensor unit requiring an excitation signal to multiple data centralizing units, comprising the steps of:
   (a) exciting said sensor unit with an excitation signal representing source outputs from a plurality of separate data centralizing units;
   (b) passing said excitation signal through a fixed resistor;
   (c) detecting the voltage drop across said fixed resistor and generating a first signal indicative of said drop;
   (d) detecting the voltage drop across said sensor unit and generating a second signal indicative of said drop; and
   (e) processing said first and second signals to determine a resistive value for said sensor unit.

6. The method of claim 5, in which said sensor unit comprises a resistive temperature device.

7. The method of claim 5, in which said steps of detecting voltage drops include the substeps of low-pass filtering said first and second signals.

8. The method of claim 5, in which said step of processing said first and second signals includes the substeps of digitized said first and second signals and digitally processing said signals under software control.

9. A fault-tolerant system for interfacing multiple data centralizing units to a single sensor unit requiring an excitation signal, comprising:
   (a) a resistive device characterized by resistance variable in accordance with conditions;
   (b) a resistor characterized by resistance which is fixed with respect to process conditions and which is connected in series with said resistive device;
   (c) a plurality of data centralizing units each including:
   (1) means for providing and applying an excitation signal to said resistive device and said resistor,
   (2) means for producing a first signal indicative of the voltage drop across said resistive device,
   (3) means for producing a second signal indicative of the voltage drop across said resistor,
   (4) means for digitizing said first and second signals in order to generate first and second digitized signals, respectively, and
   (5) microprocessor means for processing said first and second digitized signals and generating an output signal indicative of environmental conditions as indicated by said first signal and said second signal.

10. The system of claim 9, in which said means for detecting voltage drops include operational amplifiers configured as low-pass filters.

* * * * *